(12) United States Patent
Fratani et al.

(10) Patent No.: US 11,050,374 B2
(45) Date of Patent: Jun. 29, 2021

(54) METHOD FOR CUSTOMISING THE OPERATION OF AN ALTERNATOR REGULATOR

(71) Applicant: MOTEURS LEROY-SOMER, Angouleme (FR)

(72) Inventors: Jeremy Fratani, Magnac-sur-Touvre (FR); Vincent Morisseau, La Rochefoucauld (FR); Jean-Francois Paillou, Orleans (FR)

(73) Assignee: MOTEURS LEROY-SOMER, Angouleme (FR)

( * ) Notice: Subject to any disclaimer, the term of this patent is extended or adjusted under 35 U.S.C. 154(b) by 2 days.

(21) Appl. No.: 16/306,770

(22) PCT Filed: May 31, 2017

(86) PCT No.: PCT/EP2017/063186
§ 371 (c)(1),
(2) Date: Dec. 3, 2018

(87) PCT Pub. No.: WO2017/211646
PCT Pub. Date: Dec. 14, 2017

(65) Prior Publication Data
US 2019/0173405 A1 Jun. 6, 2019

(30) Foreign Application Priority Data

Jun. 6, 2016 (FR) ...................................... 1655146

(51) Int. Cl.
*G05B 13/04* (2006.01)
*H02P 21/00* (2016.01)
(Continued)

(52) U.S. Cl.
CPC ............ *H02P 21/0003* (2013.01); *H02P 9/02* (2013.01); *H02P 21/14* (2013.01); *H02P 2101/30* (2015.01)

(58) Field of Classification Search
CPC ........ H02K 17/16; H02K 17/26; H02K 19/10; H02P 2101/30; H02P 21/0003; H02P 21/14; H02P 9/02
See application file for complete search history.

(56) References Cited

U.S. PATENT DOCUMENTS 5,013,995 A 5/1991 Rashid
5,285,147 A 2/1994 Rashid
(Continued)

FOREIGN PATENT DOCUMENTS

WO WO 2015/101956 A2 7/2015

OTHER PUBLICATIONS

International Search Report dated Sep. 21, 2017 in PCT/EP2017/063186 Filed on May 31, 2017.
(Continued)

*Primary Examiner* — Muhammad S Islam
(74) *Attorney, Agent, or Firm* — Oblon, McClelland, Maier & Neustadt, L.L.P.

(57) ABSTRACT

A method for customizing operation of an alternator regulator including at least one processor executing a program governing its operation. The regulator receives input signals and acts on output signals according to at least one control law. The control law is implemented in the regulator by a programming interface by inputting at least coordinates (x, f(x)) of at least two points of the law.

13 Claims, 7 Drawing Sheets

Figure 4:
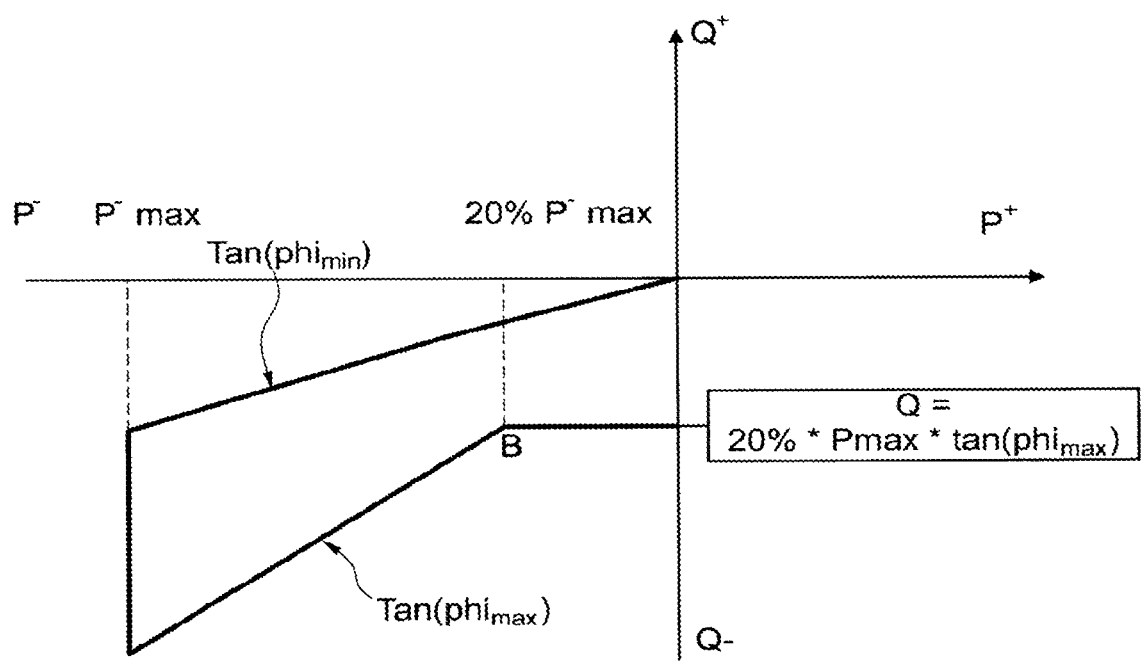

(51) Int. Cl.
*H02P 9/02* (2006.01)
*H02P 21/14* (2016.01)
*H02P 101/30* (2015.01)

(56) References Cited

U.S. PATENT DOCUMENTS

| | | | | |
|---|---|---|---|---|
| 6,025,700 | A * | 2/2000 | Czajkowski | G05B 9/03 322/37 |
| 8,829,862 | B2 | 9/2014 | Chassard et al. | |
| 2012/0032650 | A1 * | 2/2012 | Chassard | H02P 6/28 322/44 |
| 2013/0162049 | A1 * | 6/2013 | Morati | H02J 3/16 307/82 |
| 2014/0132227 | A1 * | 5/2014 | Hissel | G05B 13/042 322/28 |
| 2014/0292285 | A1 * | 10/2014 | Kadric | H02P 9/10 322/28 |
| 2015/0315989 | A1 | 11/2015 | Andrejak et al. | |
| 2016/0094171 | A1 * | 3/2016 | Syngaevskiy | H02P 9/02 322/28 |
| 2016/0329847 | A1 | 11/2016 | Mouni et al. | |

OTHER PUBLICATIONS

Preliminary French Search Report dated Feb. 7, 2017 in French Application FR 16 55146 Filed on Jun. 6, 2016.

* cited by examiner

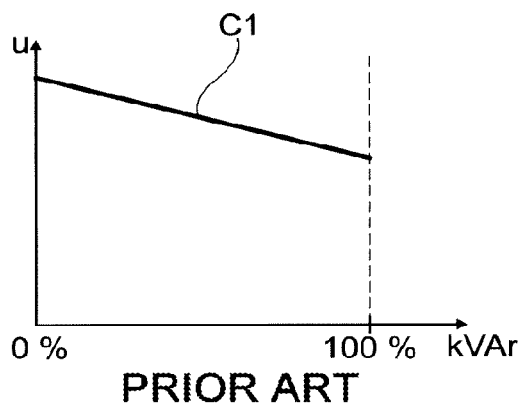
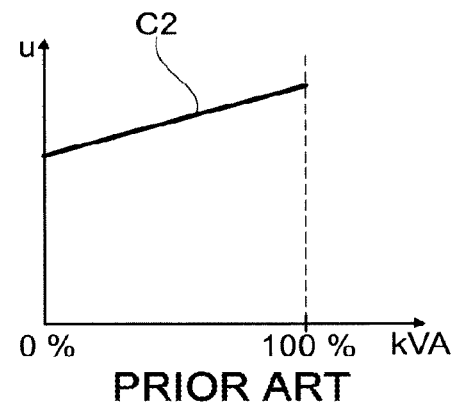
Fig. 1a
Fig. 1b
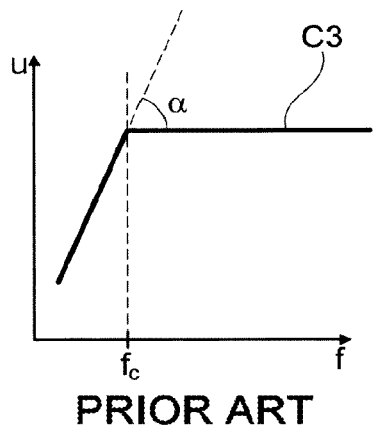
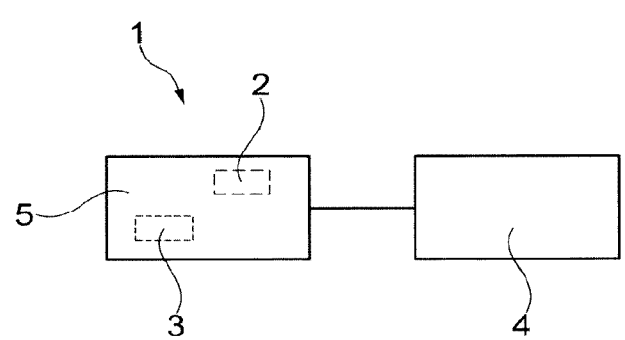
Fig. 1c
Fig. 2
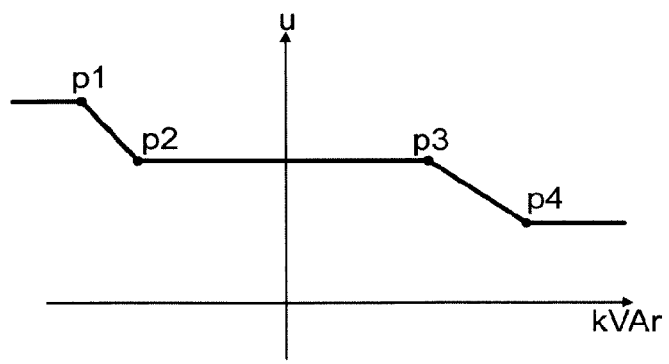
Fig. 3

METHOD FOR CUSTOMISING THE OPERATION OF AN ALTERNATOR REGULATOR

The present invention relates to a method for customizing the operation of an alternator regulator.

Alternator regulators conventionally have various regulation modes, three of the best known of which are:
- voltage regulation, for an alternator drawing from a load, whether it be isolated or placed in parallel with other alternators,
- reactive power regulation or power factor regulation at a point of the installation, for a machine alternator coupled to a network,
- excitation current regulation when the alternator is manually put into service or started up.

For each of these modes, there are various ways of giving a regulation setpoint, for example, for the voltage regulation:
- using a fixed value for this setpoint in the regulator, for example a voltage of 400 V,
- using an analog input that is able to vary the setpoint within a fixed range, for example a voltage range that makes it possible to cover +/−10% around 400 V, that is to say a voltage between 360 V and 440 V,
- using digital inputs corresponding to "increments" lower or higher than a fixed setpoint, for example pressing a button "+" or "−" that makes it possible to vary the voltage by an increment of 2 V higher or lower around 400 V,
- using a setpoint originating from an external communication, that is to say that the value of the setpoint to be reached will be given by a higher-order unit, such as an automatic machine.

In the case of voltage regulation, the setpoint may be corrected in accordance with various laws, including:
- droop, illustrated in FIG. 1a, in which the output voltage U of the alternator is regulated as a function of the reactive power supplied by the alternator. The voltage is lowered or increased in proportion to the increase in the measured reactive power. The gradient of the line c1 represents the droop coefficient;
- line voltage dip compensation, illustrated in FIG. 1b, which is similar to FIG. 1a, with the difference that the output voltage U of the alternator is regulated as a function of the supplied active power. The voltage U is lowered or increased in proportion to the measured active power and to the gradient of the line c2.
- the reactive differential, also called "cross current compensation", which allows two or more alternators in parallel to share a reactive load equally by way of a loop produced physically between the current measurements on these alternators;
- the underspeed, illustrated in FIG. 1c, making it possible to lower the voltage U setpoint in a line when the frequency f of the voltage across the terminals of the alternator is lower than a value $f_c$, called knee point value. The coefficient $\alpha$ shown in FIG. 1c is the underspeed slope, and is generally between 1 and 5.

These regulation modes are conventionally implemented in the regulator in a definitive fashion, without the possibility of modification. Only the values of the coefficients, such as the underspeed knee point and the setpoint voltage, are able to be modified.

Moreover, there are alternator regulators that are able to be programmed via an interface.

U.S. Pat. No. 8,829,862 B2 presents an alternator regulator with a programmable signal-processing interface. This interface produces a signal representative of an excitation current, which is in line with the difference between a setpoint voltage and the output voltage measured across the terminals of an electric battery of the vehicle. The circuit for controlling the excitation is commanded by a state machine that takes into account input parameters such as the temperature of the machine and instructions supplied by the unit for controlling the motor, so as to determine an operating mode suitable for the situation.

U.S. Pat. No. 5,285,147 deals with a digital voltage regulator comprising a processor that executes a program saved in memory, which responds to the input conditions of the system so as to establish a command representing the control signal level required to keep the output power of the alternator at the desired level. This command is drawn up using an algorithm including a gain and a compensation function. The logic of the algorithm and the coefficients of the gain and of the compensation function are saved by the memory circuit.

U.S. Pat. No. 5,013,995 relates to an alternator regulator implementing a programmable current limit curve. The characteristic points of the curve and the various slopes are defined on the basis of reference values and those of the detected maximum current. An algorithm calculates a current error representing the difference between the detected current and a preselected value stored in memory. This algorithm includes a gain and a compensation function whose aim is to minimize said error.

Application WO 2015/101956 relates to a system for controlling a generating set and discloses a user interface including buttons that make it possible to access a menu for setting the alternator regulator. Among the accessible parameters of the regulator are the slope of the voltage rise as a function of the rotational frequency of the set (U/f), where U is the output voltage of the alternator and f is its rotational frequency. This voltage is controlled in accordance with the law U/f so as to ensure protection of the alternator from overheating at underspeed.

Application US 2015/0315989 describes a method for regulating the injection of fuel into a combustion engine of a generating set including an alternator driven in rotation by the combustion engine, the alternator including a voltage regulator and the combustion engine including a speed regulator having an input that is able to receive an external speed setpoint. The regulation method consists in detecting a variation from the time when kinetic energy from electrical measurements on the alternator, so as to perform an action on the input of the setpoint of the voltage regulator and/or of the speed regulator. This action may be determined by a predefined control law, which is for example recorded beforehand in a table or calculated in real time.

There is a need to further refine alternator regulators so as in particular to facilitate customization thereof in such a way as to adapt their operation to the operational environment as best as possible.

The aim of the invention is to meet this need, and it achieves this, according to one of its aspects, by virtue of a method for customizing the operation of an alternator regulator including at least one processor executing a program governing its operation, said regulator receiving input signals and generating control signals as a function of at least one regulation law, this law defining setpoint values to be achieved during operation of the regulator and being able to be modified by way of a programming interface without the regulator being completely reprogrammed, in which method said at least one regulation law is implemented, in the regulator, using the interface by inputting at least the coordinates (x,f(x)) of at least two points of said law, where x is an input variable and y=f(x) is an associated setpoint value, and/or by inputting the law f itself.

By virtue of the invention, it is possible to customize the operation of the alternator regulator by inputting, as necessary, all or part of the regulation law in the form of points or of an equation, without having to completely reprogram the regulator.

The invention makes it possible to choose a regulation setpoint and an associated input variable as a function of which this setpoint will change. It is therefore possible to create, if desired, a regulation law that does not exist by default in the regulator, for example the voltage as a function of the power factor, without completely reprogramming the processor of the regulator so as to replace a version of the program governing its operation with a new higher-order version.

According to one advantageous embodiment, at least three points of a regulation law for the alternator are input using the programming interface. The program of the regulator then calculates the regulation function passing through these points.

As a variant, the regulation law is a composite of at least two functions. In other words, it is possible to chain a plurality of single regulation functions in order to obtain more complex functions.

The regulation function between two consecutive points may be linear, so as to obtain a regulation line.

The function may also be non-linear, for example polynomial.

Preferably, the input variable and the setpoint value are chosen from among all of the parameters that are available in the regulator, for example:
  the measured ambient temperature,
  the temperature measured on the power block,
  the excitation current,
  the measured voltage of the network,
  the reactive power at the terminals of the alternator,
  the power factor cos(phi) measured at the terminals of the alternator, phi being the phase difference between the alternator current and the alternator voltage,
  the power factor measured at an arbitrary connection point (supply point for example).

Preferably, the regulation law is the reactive power at the terminals of the alternator as a function of the active power thereof. The points imposed on the regulation law may be contained within a region defined by respective slope lines $\tan(\text{phi}_{min})$ and $\tan(\text{phi}_{max})$, $\text{phi}_{min}$ and $\text{phi}_{max}$ corresponding to the minimum and maximum phase differences between the current and the voltage of the alternator.

The regulation law may be the average voltage of the network as a function of the speed of the alternator.

The input variable and the setpoint value are advantageously chosen by way of a drop-down list.

Another subject of the invention, according to another one of its aspects, is an alternator regulator including at least one processor executing a program governing its operation, this program including instructions so as to be able to implement a method for customizing the operation of the regulator, said regulator receiving input signals and generating control signals as a function of at least one regulation law, this law defining setpoint values to be achieved during operation of the regulator and being able to be modified by way of a programming interface without the regulator being completely reprogrammed, the regulator being designed such that said at least one regulation law is able to be implemented using the interface by inputting at least the coordinates (x,f(x)) of at least two points of said law, where x is an input variable and y=f(x) is an associated setpoint value, and/or by inputting the law f itself.

Figure 5:
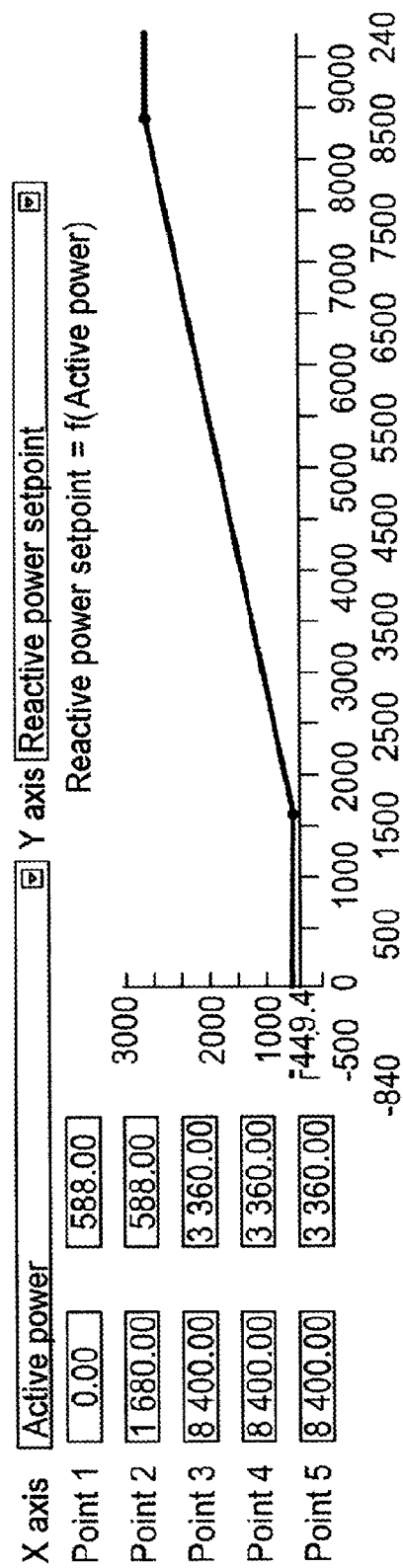
Figure 6:
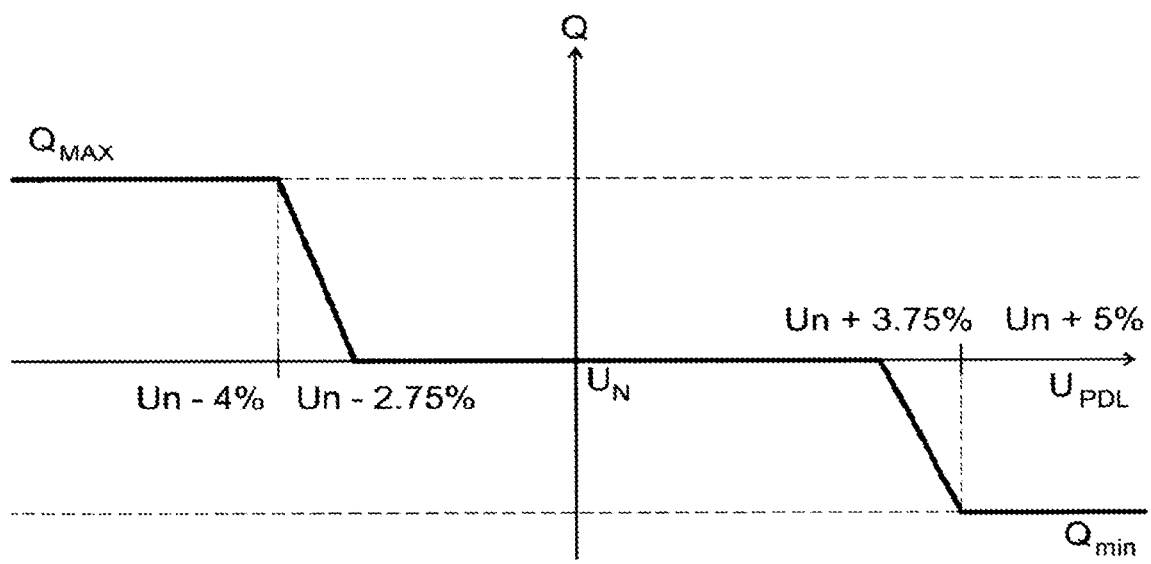
Figure 7:
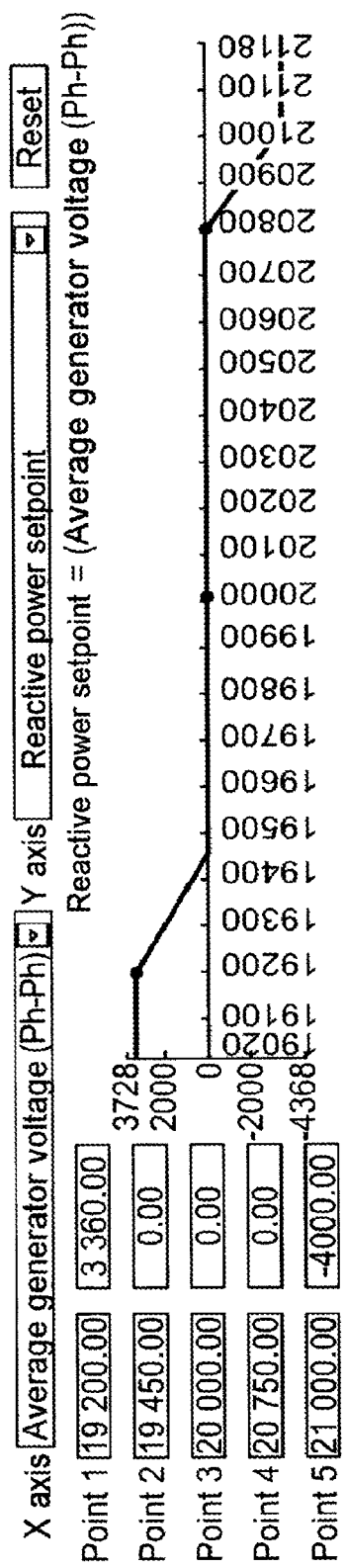
Figure 8:
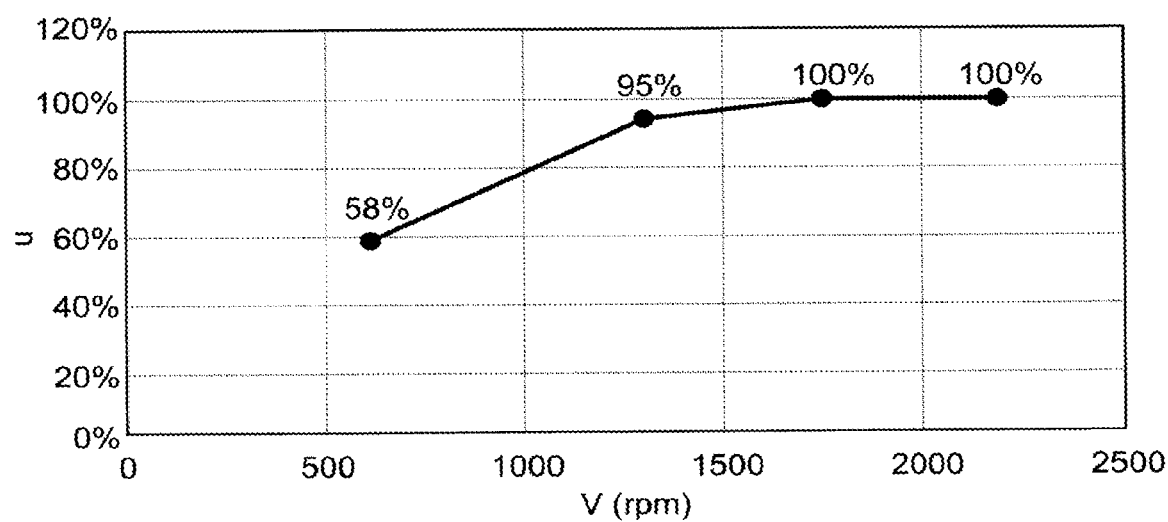
Figure 9:
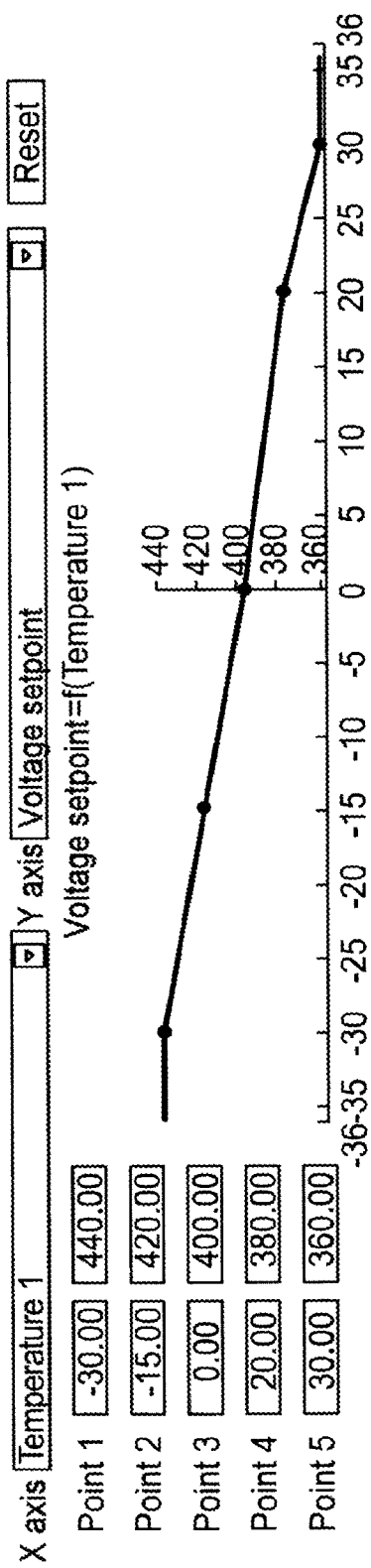

The invention will be able to be better understood upon reading the following description of exemplary nonlimiting modes of implementation thereof and upon examining the appended drawing, in which:

FIGS. 1a, 1b and 1c show curves of voltage regulation laws from the prior art,

FIG. 2 is a block diagram of a regulator and alternator assembly according to the invention, FIG. 3 shows a first exemplary regulation law according to the invention, FIG. 4 illustrates a second exemplary regulation law according to the invention, FIG. 5 shows an exemplary interface of the alternator regulator according to the invention, designed for the example of FIG. 4, FIG. 6 illustrates a third exemplary regulation law according to the invention, FIG. 7 shows an exemplary interface of the alternator regulator according to the invention, designed for the example of FIG. 6, FIG. 8 illustrates a fourth exemplary regulation law according to the invention, and FIG. 9 shows an exemplary interface of the alternator regulator according to the invention.

FIG. 2 shows an assembly 1 according to the invention, formed of an alternator 4 and of an associated regulator 5.

The alternator 4 may be of any known type, being driven in rotation for example by a combustion engine, or by another power source, in particular if the alternator is used with wind power or with hydraulic power, or else by a gas turbine.

The alternator 4 typically includes an exciter and a main machine whose inductor is supplied with power by the exciter armature. The regulator 5 makes it possible to control the current in the main machine in such a way as to keep the operation of the alternator in a predefined regime, in accordance with at least one regulation law, as will be detailed hereinafter.

The regulator 5 may be positioned in a housing separate from the alternator 4, for example in an electrical enclosure, or, as a variant, be present in a housing fixed to the casing of the alternator 4.

In the case of an alternator 4 driven by a combustion engine, the regulator 5 may receive, if appropriate, information from the controller of this engine, for example in order to perform regulation that anticipates the load variations.

The regulator 5 includes a processor 2 including for example one or more microcontrollers with associated electronics. The regulator 5 also includes an interface 3 that allows an operator to input parameter values into the regulator and/or other data.

The interface 3 includes for example buttons, a keypad, a display, a screen, in particular a touchscreen, a communication port, for example in accordance with the USB, RS232 or RS485 standard, and all combinations of these data input/output means.

The regulator 5 includes a measurement interface that makes it possible to read signals representative of the operation of the alternator, for example the output voltage value of the alternator, the value of the currents within the inductor of the main machine, the armature of the main machine, the armature of the exciter, the inductor of the exciter, and the temperature at one or more points of the alternator, for example the temperature of the rotor or stator winding or of the bearings.

The regulator 5 may also receive signals from the machine that drives the alternator 4, if appropriate, as mentioned above.

The regulator 5 may include a power interface that makes it possible for example to drive the current in the inductor of the main machine.

The processor 2 includes at least one memory, for example of EEPROM type, which contains at least one program governing the operation of the regulator 5. This program is loaded into the regulator when it is manufactured. This program makes it possible to ensure that the operation of the alternator 4 is regulated in accordance with at least one regulation law that is implemented by default.

The program also makes it possible to manage the interface 3 in such a way as to allow the operator to modify values that are present in the regulator by default.

According to the invention, the regulator 5 is designed such that the operator is able to have a great degree of freedom when customizing the operation of the regulator 5, without having to replace the existing version of the program with a new version.

Specifically, the regulator 5 is designed such that the operator is able to:
  select the nature of the input variable x,
  select the nature of the associated setpoint y,
  input the coordinates of at least two points of the regulation law y=f(x).

By way of example, FIG. 3 illustrates the case where the regulator 5 is designed to allow the operator to input four operating points p1 to p4 of a regulation law U=f(kVAr), U being the output voltage of the alternator, which may be the average voltage measured over the three phases, and kVAr being the reactive power defined as being the average of the reactive powers of each phase of the alternator.

Thus, using the interface 3, the user is able to input the coordinates of each of the points p1 to p4.

The regulator 5 is designed so as to apply, during operation, the regulation law as shown in FIG. 3, which passes through the points p1 to p4 and which has linear intervals.

During the regulation, the intermediate points between the points p1 to p4 input by the user may be calculated in real time by the processor 2. As a variant, once the points p1 to p4 have been input into the interface 3 by the user, the processor 2 calculates intermediate points between these points input by the user and stores them in a table. During operation of the regulator, the processor directly links the values thus present in the table, thereby possibly saving calculating time.

In one variant embodiment, the regulator 5 is designed to allow the operator to input a law y=f(x) in its algebraic form. The regulator 5 includes an editor that interprets the law input in its algebraic form in order to calculate y=f(x) at any point during the regulation. As a variant, the regulator 5 calculates, as soon as the law is input by the operator, the points of the regulation function and stores them in a table that the processor 2 then accesses during the regulation, so as to avoid having to calculate values in real time.

FIG. 4 illustrates a second exemplary regulation law: Q(kVAr)=f(P(kW)), P being the active power of the alternator. This regulation law is for example the one provided by an electricity supplier contract for connecting the alternators to the network. The region defined by the respective slope lines $\tan(\text{phi}_{min})$ and $\tan(\text{phi}_{max})$, $\text{phi}_{min}$ and $\text{phi}_{max}$ corresponding to the minimum and maximum phase differences between the current and the voltage of the alternator, defines the authorized regulation points. For example, point B has the coordinates $(0.2 \ast P_{max}, 0.2 \ast P_{max} \ast \tan(\text{phi}_{max}))$.

FIG. 5 shows an example of an alternator regulator interface in which the input variable and the setpoint value are chosen by way of a drop-down list. In this example, the choice is made so as to obtain the regulation law of FIG. 4. By virtue of this interface, it is possible to input the coordinates of a plurality of points.

FIG. 6 illustrates another exemplary regulation law for connecting the alternator to the network, with regulation of the kVAr as a function of the voltage at the supply point: $Q=f(U_{PDL})$. The regulation is thus carried out locally as a function of the voltage measured on the network. If this voltage decreases, the reactive power is increased, and if $U_{PDL}$ increases, the reactive power is decreased. FIG. 7 shows the interface of the regulator, making it possible to drive the reactive power as a function of the voltage measured on the network.

FIG. 8 illustrates an exemplary regulation law in which the average voltage of the network, measured as a percentage of the nominal voltage, is regulated as a function of the speed of the alternator measured as a number of rotations per minute: U=f(V). By way of example, the coordinates of four points of this regulation law are input via the interface of the regulator.

In FIG. 9, the average voltage setpoint of the network is regulated as a function of the temperature measured at the winding of the stator of the alternator. The voltage decreases when the temperature increases in order to avoid overheating.

The invention is not limited to the exemplary regulation laws given in FIGS. 3 to 9. In particular, the number of points input by the user may be different. The regulator 5 is for example designed to allow the operator to input the number of points that he wishes to impose for the regulation law; the regulator 5 then invites him successively to input the coordinates of these various points.

The parameters of the regulation law may be different from those in the examples given.

For example, there is the input variable that is chosen from among the temperature measured at the winding of the stator of the alternator, the excitation current, the average voltage of the network, the average reactive power supplied by the alternator, the power factor cos(phi) of the alternator of one of the phases, phi being the phase difference between the current of the phase under consideration and the voltage of this same phase, and the associated setpoint variable may be chosen from the same list or from among the other parameters of the regulator.

It is possible to produce the regulator 5 in such a way as to allow the operator to input a plurality of regulation laws, these regulation laws being for example applied in parallel or applied such that the final regulation law is a function formed of the various input regulation functions.

The invention claimed is:
1. A method for customizing operation of an alternator regulator including at least one processor executing a program governing its operation, the method comprising:
  the regulator receiving input signals and generating control signals as a function of at least one regulation law, the law defining setpoint values to be achieved during operation of the regulator, and the law configured to be modified by a programming interface without the regulator being completely reprogrammed; and selecting a regulation setpoint and an associated input variable as a function of which the regulation setpoint changes, wherein the at least one regulation law is implemented, in the regulator, using the programming interface by inputting at least the coordinates (x,f(x)) of at least two points of the law f, wherein x is an input variable and y=f(x) is an associated setpoint value, and/or by inputting the law f itself.

2. The method as claimed in claim 1, wherein three points of the regulation law are input using the programming interface.

3. The method as claimed in claim 1, wherein the regulation law is a composite of at least two functions.

4. The method as claimed in claim 1, wherein a function between two consecutive points is linear.

5. The method as claimed in claim 1, wherein a function between two consecutive points is non-linear.

6. The method as claimed in claim 1, wherein the input variable is chosen from among the following parameters:
measured voltage of the network;
reactive power at the terminals of the alternator;
power factor cos(phi) measured at terminals of the alternator, phi being phase difference between the alternator current and the alternator voltage.

7. The method as claimed in claim 1, wherein the regulation law is reactive power at terminals of the alternator as a function of active power thereof.

8. The method as claimed in claim 1, wherein the regulation law is average voltage of the network as a function of speed of the alternator.

9. The method as claimed in claim 1, wherein the input variable and the setpoint value are chosen by a drop-down list.

10. The method as claimed in claim 2, wherein a fourth point is input using the programming interface.

11. The method as claimed in claim 6, wherein the setpoint value is chosen from among the parameters.

12. The method as claimed in claim 7, wherein the points imposed on the regulation law are contained within a region defined by respective slope lines $\tan(\text{phi}_{min})$ and $\tan(\text{phi}_{max})$, $\text{phi}_{min}$ and $\text{phi}_{max}$ corresponding to minimum and maximum phase differences between current and voltage of the alternator.

13. An alternator regulator comprising:
at least one processor executing a program governing its operation, the program including instructions implementing a method for customizing operation of the regulator, the method comprising:
the regulator receiving input signals and generating control signals as a function of at least one regulation law, the law defining setpoint values to be achieved during operation of the regulator, and the law configured to be modified by a programming interface without the regulator being completely reprogrammed; and
selecting a regulation setpoint and an associated input variable as a function of which the regulation setpoint changes,
wherein at least one regulation law is implemented, in the regulator, using the interface by inputting at least the coordinates (x,f(x)) of at least two points of the law, wherein x is an input variable and y=f(x) is an associated setpoint value, and/or by inputting the law f itself.

* * * * *